Jan. 2, 1940.     P. CHERNOW     2,185,659
AUTOMATIC ELECTRIC LAWN MOWER
Filed Sept. 2, 1938
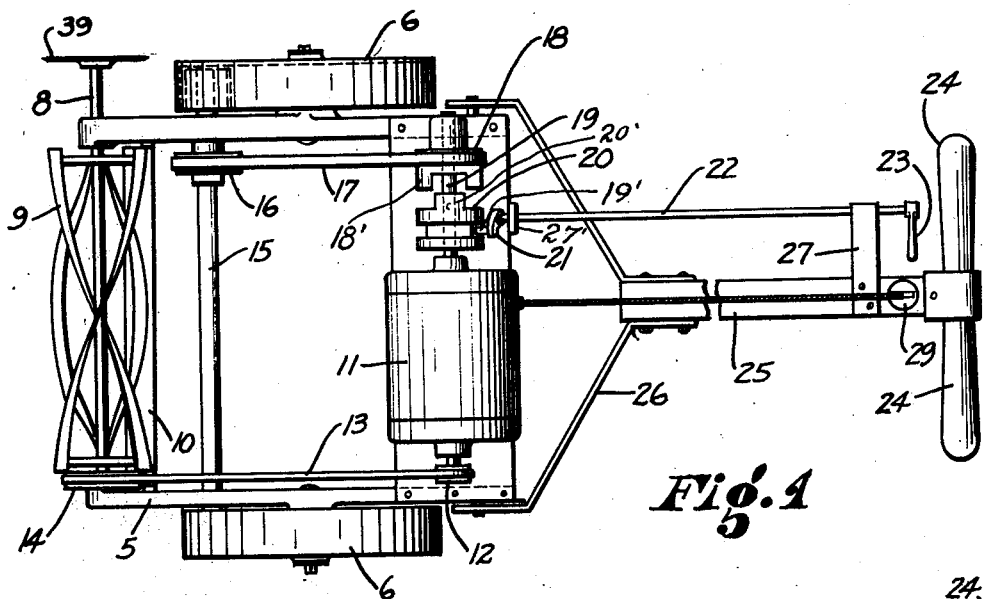
Fig. 1
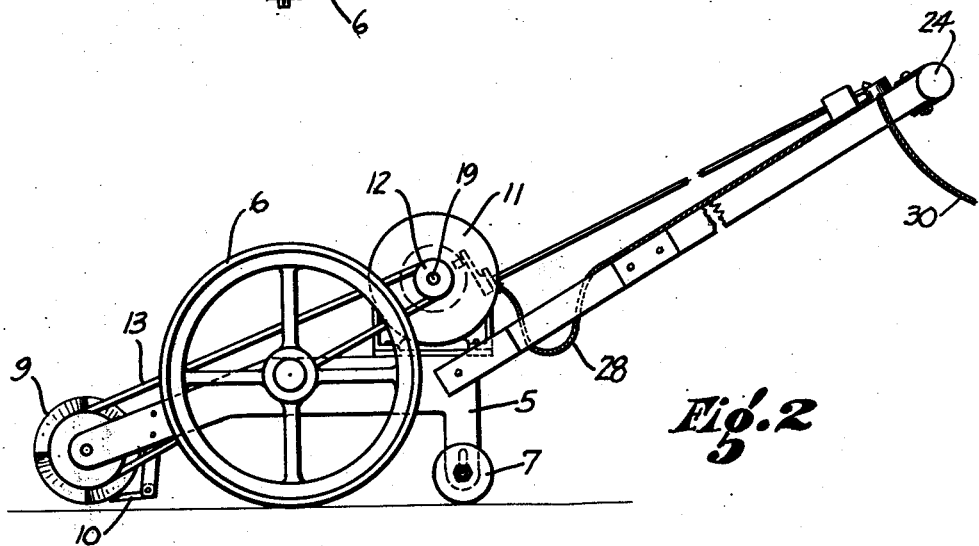
Fig. 2
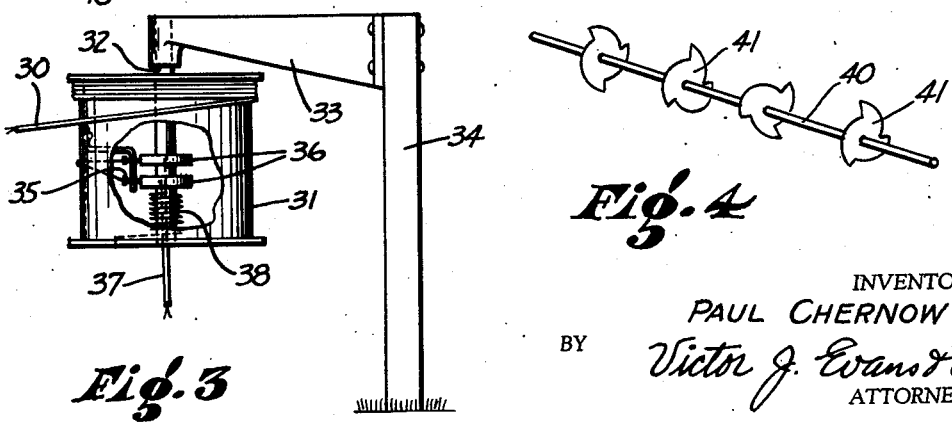
Fig. 3
Fig. 4
INVENTOR.
PAUL CHERNOW
BY Victor J. Evans & Co.
ATTORNEYS Patented Jan. 2, 1940

2,185,659

UNITED STATES PATENT OFFICE 2,185,659

AUTOMATIC ELECTRIC LAWN MOWER

Paul Chernow, Los Angeles, Calif.

Application September 2, 1938, Serial No. 228,217

1 Claim. (Cl. 56—25)

This invention relates to lawn mowers.

An object of the invention is to provide a simple, practical and efficient machine of the character described.

Another object is to provide an improved and simplified motor lawn mower.

Other objects and advantages will appear and be brought out more fully in the following specification, reference being had to the accompanying drawing wherein Fig. 1 is a plan view of an embodiment of my invention.

Fig. 2 is a side view of the same.

Fig. 3 is a side view partly broken away of a cord reel and

Fig. 4 is a perspective view of a modified form of the cutter.

Referring more particularly to the drawing, I show a lawn mower having a frame 5, traction wheels 6 and adjustable guide wheels 7. A shaft 8 suitably mounted between frame members 5 carries a rotary cutter 9 and a fixed cutter blade 10 is suitably secured to frame members 5. Frame 5 supports a motor 11 having a pulley 12 which drives a belt 13, the latter in turn driving a pulley 14 on shaft 8. Traction wheels 6 are driven by internal gears on a shaft 15 suitably mounted on frame members 5, shaft 15 being driven by pulley 16 mounted thereon which in turn is driven by belt 17 running over a pulley 18 on shaft 19 of motor 11.

Pulley 18 is formed to provide a diametrically recessed clutch element 18' and is not fixed to the shaft 19, but is connected thereto through a clutch member 20 keyed to and slidably mounted on the shaft 19 and provided with an annular groove having mounted therein a stud 19' secured to an arm 21 connected by a rod 22, to an operating lever 23. Clutch member 20 includes a lug 20' for fitting the recess of the clutch member 18', and it will be obvious from Figure 1, that the lug 20' is movable into and out of the recess of the clutch member 18' for engagement and disengagement of the clutch members, to bring about starting and stopping of the traveling movement of the machine along the ground, and the clutch can be readily operated, due to the arrangement of the lever 23 with respect to the handle 24.

The machine is provided with the usual handle 24 on one end of the steering and push bar 25 that is suitably secured by yoke arms 26 to the frame members 5. Brackets 27 and 27' mounted on the bar 25 and frame 5 respectively, serve as bearing supports for the rod 22.

The motor is provided with power through an electrical cable 28 connected to a switch 29 on bar 25. Cable 30 connected to switch 29 is wound around a drum 31 rotatably mounted on a shaft 32 and by a bracket 33 suitably supported on a pedestal 34. Cable 30 terminates in a pair of contacts 35 which makes sliding contacts with rings 36 to which the ends of power cable wires 37 are connected. Spiral spring 38 is connected between drum 31 and shaft 32 and is adapted to keep cable 30 wound thereon during the movement of the lawn mower about a yard.

An auxiliary sidewalk trimmer in the form of a disk 39 having a cutting edge, is adapted to be detachably secured to shaft 8 and used when desired.

In Fig. 4 I show a shaft 40 having a plurality of peripherally toothed disk-like cutters 41 secured thereto in equi-distantly spaced relation, and the cutters 41 are especially adapted for cutting devil grass. Shaft 40 is adapted to be used in place of shaft 8 and cutter 9 when it is desired to cut devil grass.

Having described my invention, what I claim is:

In a lawn mower, a handled frame including spaced parallel members, traction wheels carried by said frame, a drive shaft journaled in said frame members and geared to the traction wheels, clutch controlled motor operated driving means connected to said shaft for driving the same, cutting means including a shaft bridging and journaled in the frame members and being of a length to provide a portion extending a considerable distance laterally and outwardly beyond one of said frame members, a cutting disk carried by the outer end of the extending portion and detachably connected thereto, and means between the driving means and the last mentioned shaft for driving the latter.

PAUL CHERNOW.